Patented Feb. 20, 1923.

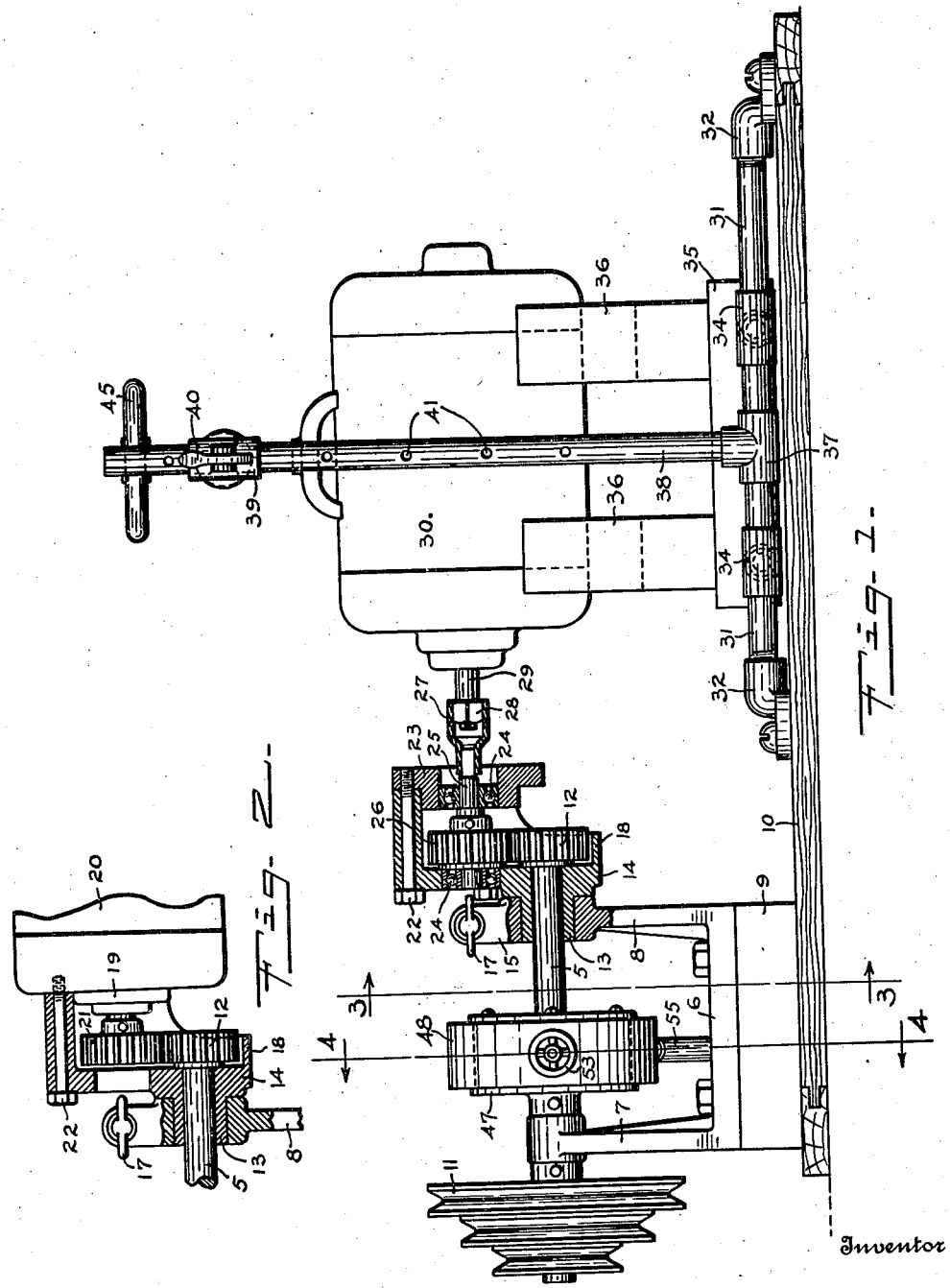

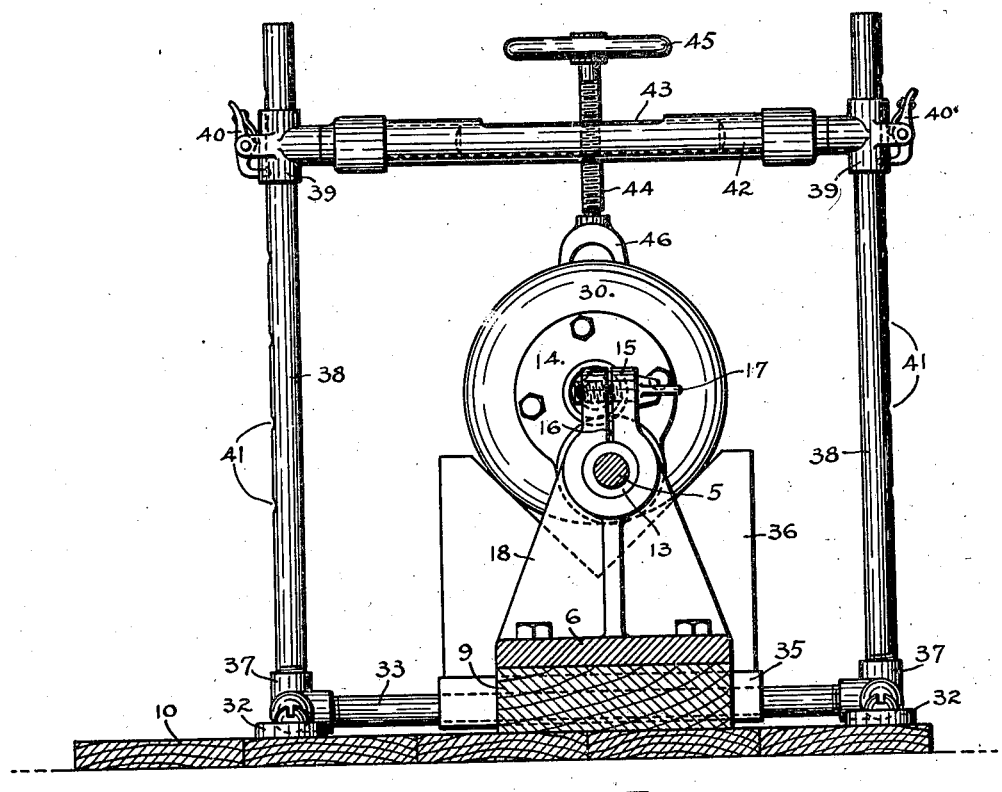
Fig-3-
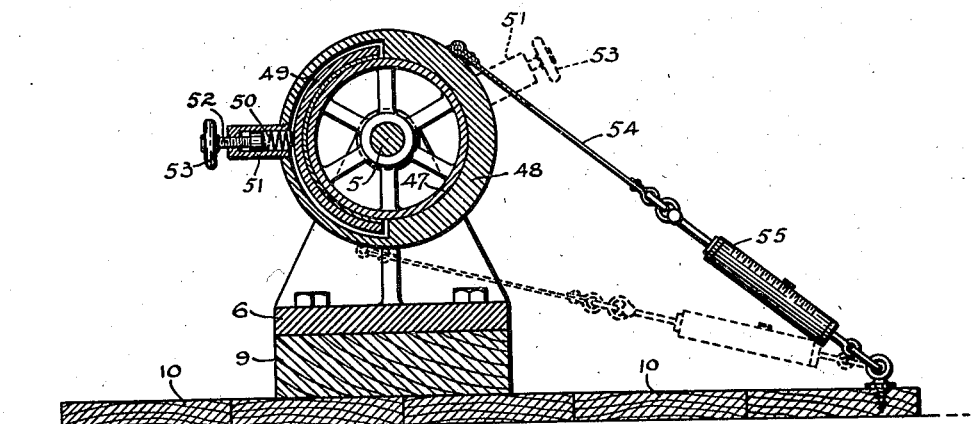
Fig-4-

1,445,923

UNITED STATES PATENT OFFICE.

GEORGE C. WILDER, OF HARLAN, IOWA.

TESTING STAND FOR DYNAMO-ELECTRIC MACHINES.

Application filed February 25, 1922. Serial No. 539,322.

*To all whom it may concern:*

Be it known that I, GEORGE C. WILDER, a citizen of the United States, and a resident of Harlan, in the county of Shelby and State of Iowa, have invented certain new and useful Improvements in Testing Stands for Dynamo-Electric Machines, of which the following is a specification.

My invention relates to machines for testing dynamo-electric machines, to determine the power output of motors and the electrical output of generators. It is the particular object of my invention to provide a simple, inexpensive, durable and conveniently operated device for use in testing motors and generators of the types commonly used in the starting and lighting systems of motor-vehicles. The device provided by my invention is specially characterized by the facility with which the same may be adjusted for use with motors and generators varying in size and power within the limits encountered in dynamo-electric machines for the purposes above mentioned.

In the accompanying drawings Fig. 1 is a side elevation, partially in longitudinal section, of a structure embodying my invention, Fig. 2 is a detail longitudinal section showing a generator connected directly with the planetary or epicyclic gear-case, Fig. 3 is a transverse section on the plane of the line 3—3 of Fig. 1, and Fig. 4 is a transverse section on the line 4—4 of Fig. 1.

In the illustrated embodiment of my invention I provide a shaft 5 which is revolubly mounted in a stand comprising a base 6 and integral bearing-standards 7 and 8, said base being secured upon a block 9 which is affixed to a table or bench 10. The shaft 5 is journaled directly in the bearing-standard 7, and adjacent thereto carries a cone-pulley 11 which may be connected by belt with a suitable source of power, when the device is to be used for testing generators. Upon the end of the shaft 5 opposite the pulley 11 there is carried a pinion 12, and the adjacent portion of the shaft is journaled in a sleeve 13 which extends from the casing-member 14 into the standard 8, fitting revolubly therein. At the upper side of said standard 8 are lugs 15 between which is a kerf 16 extending down to the bore in which the sleeve 13 is fitted. A thumb-screw 17 is provided by which the lugs 15 may be drawn toward each other to clamp the sleeve and hold the casing-member 14 in adjusted relations to the standard. The main portion of the casing 14 extends laterally from the sleeve 13, there being a peripheral flange 18 concentric with the sleeve, for enclosing one side of the pinion 12. Said flange 18 is continued at the outer part of the casing, and at said part is of greater length than the portion adjoining the pinion. Said outer or extended portion of the flange is adapted to fit around the boss 19 and against the end of the casing of a generator 20 of a certain standard type, whereof large numbers are now in use, so that when the generator is thus engaged with the casing the gear 21 on the armature-shaft of the generator will be in operative mesh with the pinion 12, as shown in Fig. 2. Screws 22 extend through suitable openings in the housing or casing 14 and said outer portion of the flange 18, entering threaded holes in the generator-casing, whereby to hold the latter in position. The parts are so proportioned that the threaded screw-holes in the generator-casing are the same employed in mounting the same upon its support when it is in use. It will thus be seen that for testing generators of the type above mentioned, it is merely necessary to mount the generator upon the casing-member 14, securing the same thereto with one or more of the screws 22; then apply power to the pulley 11 to drive the shaft 5 at a suitable speed; and then to measure the electrical output of the generator by connecting therewith a suitable voltmeter and an ammeter.

For testing dynamo-electric machines of types unsuited for direct connection with the casing 14, as above described, I employ the additional devices shown in Figs. 1 and 3. A plate 23 is provided which is adapted to fit against the end and to extend slightly within the flange-portion of the casing, and to be retained thereon by means of the screws 22. In said plate 23, and in the side of the casing opposite thereto, are bearings 24 for a countershaft 25 on which is a gear 26 adapted to mesh with the pinion 12. The end of the countershaft 25 is squared to receive slidably thereon a tubular connecting-member or adapter 27, the outer end of the adapter being formed so as to fit over a nut 28 which is screwed onto the threaded end of the armature-shaft 29 of a motor or generator 30. Preferably, a plurality of the adapters are provided, suitable for engagement with any of the numerous types of dynamo-electric machines which it may be desired to mount on the testing-stand. For supporting the machines to be tested, there is provided an adjustable clamping mechanism, which is preferably constructed as follows: On the bench 10 there is mounted a pair of tubular rails 31 which extend parallel with the shaft 5, the ends of said rails being screwed into suitable foot-pieces 32 which are secured to the bench. Tubular cross-pieces 33 are provided at the ends with T-heads 34 which fit slidably on the rails 31, and said cross-pieces support a base-block 35 on which is disposed a pair of V-blocks 36. The latter are adapted to receive and support the cylindrical body of the motor or generator, so that the armature-shaft thereof is horizontal and parallel with the shaft 5. The countershaft 25 is brought into alinement with the armature-shaft 29 by swinging the casing 14 about the axis of the sleeve 13 until the counter-shaft is at the desired height, then clamping the casing in adjusted position by tightening the thumb-screw 17, and then shifting the base-block 35 and V-blocks 36 laterally upon the cross-members 33 until the armature-shaft is in position for connection with the counter-shaft by means of the adapter 27. The final movement to engage the adapter with the squared end of the countershaft may be effected by shifting the cross-members 33 longitudinally upon the rails 31. On each of the rails 31, between the T-heads 34 of the cross-pieces, there is slidably mounted a T-member 37 from which a tubular standard 38 extends upwardly. On said standards 38 are slidably mounted the T-members 39, each of which carries a latch device 40 having a portion adapted to enter one of a series of holes 41 in the standards, whereby to retain the members 39 at adjusted heights thereon. Between the members 39 there is supported a tubular cross-piece 42, and the latter incloses a slidable cylindrical block 43 having at the central part thereof a threaded opening for receiving the clamp-screw 44. Said screw 44 extends vertically through slots in the upper and lower side of the cross-piece 42, the extent of said slots being such as to permit the required transverse movement of the clamp-screw to position the same above the machine 30 on the V-blocks 36. The upper end of the clamp-screw carries a hand-wheel 45, and the lower end of the screw has swivelled connection with a spider 46, of which the arms are engageable with the motor or generator to clamp the same against the V-blocks.

To enable the determination of power output from motors, the shaft 5 is provided with a Prony brake, which is preferably of the construction illustrated in Figs. 1 and 4. A flanged brake-wheel 47 is secured to the shaft between the standards 7 and 8, and upon said wheel 47, between the flanges thereof, is mounted the brake-band 48. At one side the band 48 directly engages the wheel, and at the other side the bore thereof is recessed to receive a shoe 49 which is pressed yieldingly against the wheel by means of a spring 50, said spring being enclosed in a tubular boss 51 extending radially from the band 48. Compression of said spring 50 is variable by means of an adjusting-screw 52 which is provided at its outer end with a small hand-wheel 53. Rotation of the brake-band 48 is prevented by means of a flexible tension-member 54 which is attached thereto and extends tangentially therefrom to connect with a tension dynamometer 55, the latter being pivotally connected with the bench 10, as shown in Fig. 4, whereby to be freely swingable to two positions oppositely tangential to the brake-band, as indicated by the full and dotted lines in Fig. 4. By the described arrangement of the dynamometer and the flexible tension-member 54, the shaft and brake-wheel may be driven in either direction, and any extension of the dynamometer-spring may occur, without preventing accurate determination of the torque at the radius of the brake-band periphery. In determining the power output of a motor the same is mounted upon the testing-stand in the manner described, and electrical energy supplied thereto, suitable for operating the same in a normal manner. The brake-band pressure is then adjusted until the desired testing-speed is attained, and thereafter, from the dynamometer indication and by a simple and well-known calculation, the power delivered by the motor is known. For comparative indications of the power of different motors, a direct reading of the dynamometer will suffice.

Now, having described my invention, what I claim and desire to secure by Letters Patent is:

1. In a mechanism of the class described, a shaft, a drive-pulley thereon, a pinion carried on said shaft, a casing mounted to swing about the axis of said shaft, means for holding said casing in adjusted positions, a countershaft journaled in said casing, a gear carried by said countershaft and meshing operatively with the pinion at all adjusted positions of the casing, means for holding a dynamo-electric machine with the armature-shaft thereof in proximity to the counter-shaft, and means operatively connecting said armature-shaft and the counter-shaft.

2. In a mechanism for testing dynamo-electric machines a clamping device for holding in fixed position the machines to be tested, a shaft journaled in parallelism with the armature-shaft of a machine held by said clamping device, a drive pulley and a brake carried by said shaft, a countershaft, means connecting said countershaft and an armature-shaft, a swingable member in which the countershaft is supported, planetary gearing connecting said first-named shaft and the countershaft, and means for holding said swingable countershaft-supporting member in adjusted positions to aline the countershaft with the armature-shaft of a machine held by said clamping device.

3. In a mechanism of the class described, the combination with a shaft journaled in fixed bearings, and means for connecting a motor therewith to drive the same, of a brake-wheel secured to said shaft, a brake-band encircling said wheel, means for varying the pressure between said brake-band and brake-wheel, a tension dynamometer, and a flexible tension member connecting the same with the peripheral portion of the brake-band, said tension member adapted to extend tangentially from the brake-band to the dynamometer in opposite directions according to the direction of rotation of the brake-wheel.

4. In a machine of the class described, the combination with a drive-shaft journaled on a fixed axis, and means for holding a dynamo-electric machine with its armature-shaft in parallelism with said drive-shaft, of means for adjusting said holding means transversely of the shaft-axes, a gear-case movable about the drive-shaft axis, a countershaft journaled in the gear-case, epicyclic gears connecting said drive-shaft and countershaft, means for securing said gear-case in fixed adjusted positions to aline the countershaft and the armature-shaft of a machine held by the holding means, and a detachable adapter for operatively connecting the countershaft and armature-shaft.

GEO. C. WILDER.